Jan. 11, 1938.   G. E. BULLOCK   2,105,451
PRESSURE TANK
Filed April 20, 1936   3 Sheets-Sheet 1
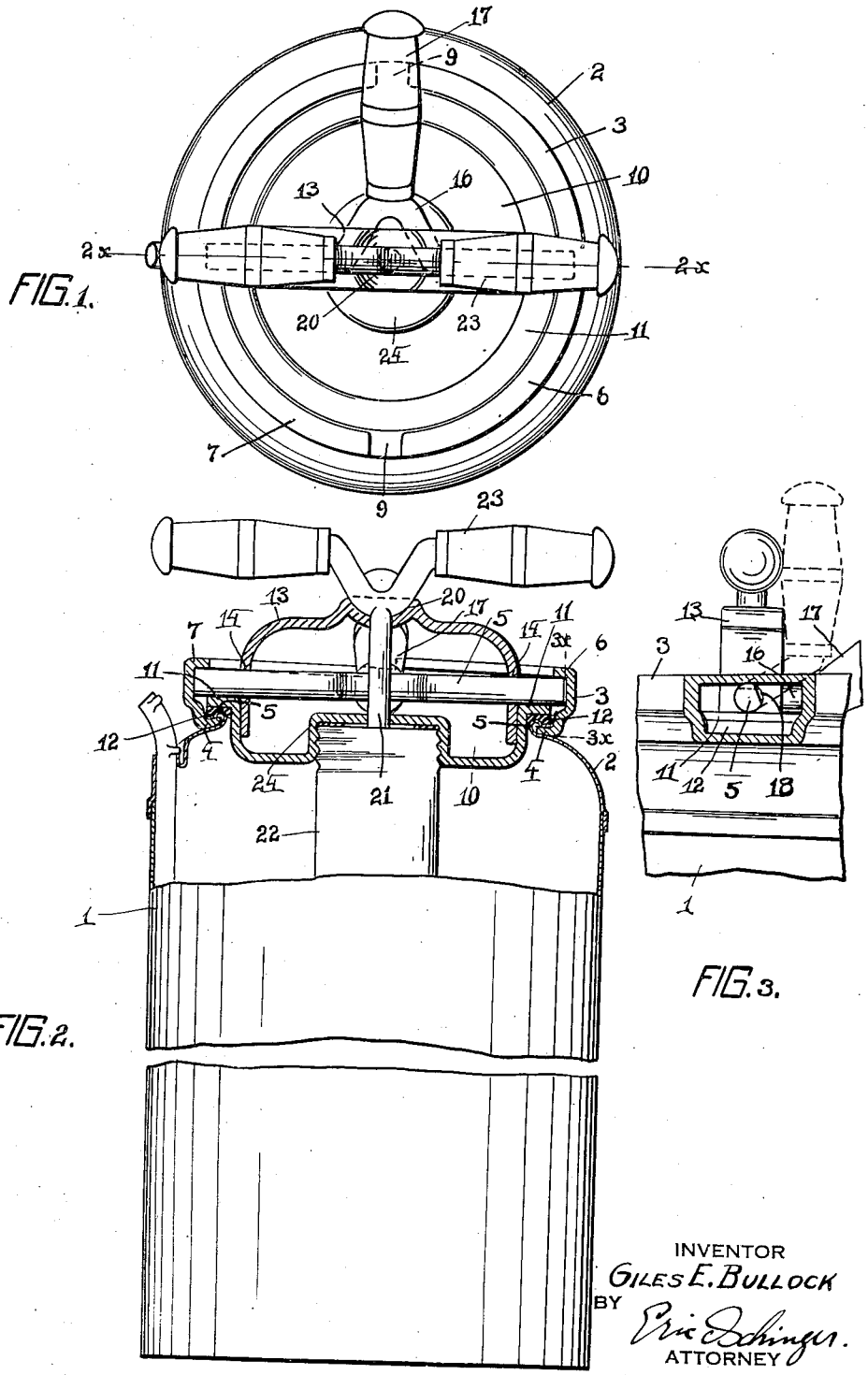
INVENTOR
GILES E. BULLOCK
BY
ATTORNEY

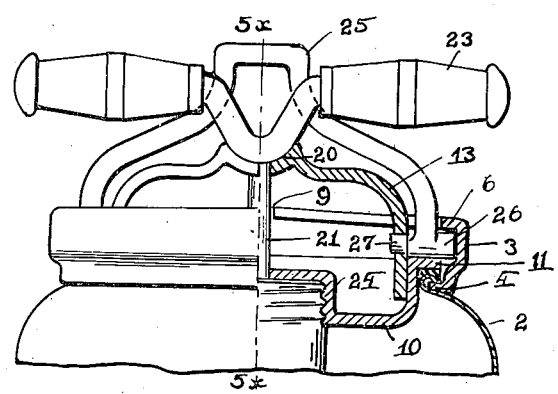
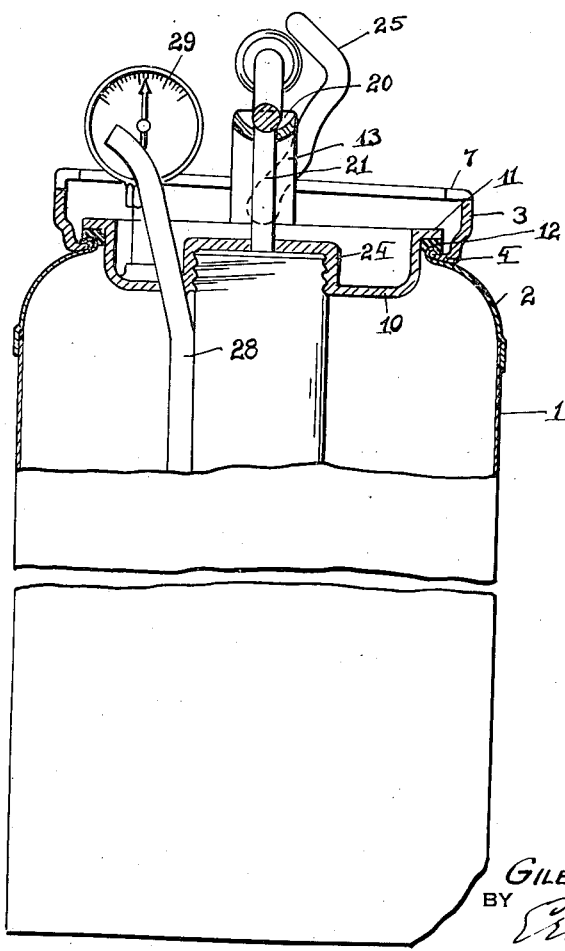

Jan. 11, 1938.  G. E. BULLOCK  2,105,451
PRESSURE TANK
Filed April 20, 1936   3 Sheets-Sheet 3

INVENTOR
GILES E. BULLOCK
BY
ATTORNEY

Patented Jan. 11, 1938

2,105,451

UNITED STATES PATENT OFFICE 2,105,451

PRESSURE TANK

Giles E. Bullock, Rochester, N. Y.

Application April 20, 1936, Serial No. 75,332

13 Claims. (Cl. 220—57)

This invention relates to sprayers and has for one of its objects to provide a sprayer with a pressure tank having a large open head and closure member therefor including double acting locking means whereby the closure member is first locked to the head and then hermetically sealed over the large opening therein.

Another object of this invention is to provide the closure member with preliminary locking means and quick acting secondary locking means for closing the opening in the head.

A further object of this invention is to provide the closure member with double acting locking means having a safety release which operates to have the pressure in the tank release the closure member from its seat to reduce the pressure in the tank while keeping the closure member locked to the head until removed therefrom.

Another object of this invention is to provide the closure member and head of the pressure tank of the sprayer with novel locking means which are operated by a cam moving in a vertical plane.

A further object of this invention is to provide the novel locking means for the closure member with an operating handle having a short locking and unlocking movement.

A further object of this invention is to so combine the handle of the sprayer tank with the handle of the pump thereof that both may be gripped in one hand for carrying purposes.

Another object of this invention is to provide the closure member with a novel form of handle which operates to hold the pump handle of the sprayer in a predetermined position with relation thereto.

A further object of this invention is to provide the sprayer with a novel form of pump handle.

Another object of this invention is to provide a sprayer with a tank having a large open head and a closure member for the head which is adapted to support the pump, the delivery tube and a pressure gauge for the sprayer.

A further object of this invention is to provide a sprayer with a tank having a closure member, a pump with a pump handle supported on the closure member and a locking handle for sealing the closure member on the tank in one position and locking the pump handle against movement on the closure member in another position.

All these and other objects of this invention will become more readily apparent from the detailed description thereof which follows, reference being had to the accompanying drawings in which Figure 1 is a top plan view of a sprayer provided with the novel large open head and closure member with double acting locking means therefor.

Figure 2 is a partial section and side elevation of the open headed sprayer embodying the novel double acting locking means for the closure member thereof.

Figure 3 is a detail sectional view and side elevation of a portion of the tank and head of the sprayer, the section being taken on the line $3x$—$3x$ of Figure 2.

Figure 4 is a partial side elevation and sectional view of the upper portion of the sprayer embodying a modified form of the double acting locking means for the closure member of the head of the tank.

Figure 5 is a partial elevation and sectional view of the modified form of sprayer illustrated in Figure 4, the section being taken on the line $5x$—$5x$ of Figure 4.

In the several figures of the drawings like reference numerals indicate like parts.

Figure 6:
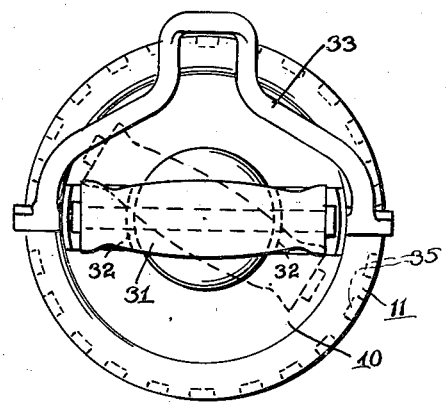
Figure 6 is a top plan view of another modified form of the closure member for the open head of the sprayer tank.

The construction of the sprayer forming the subject matter of my present invention includes a novel large open head for the tank of the sprayer and a novel closure member with double acting locking means for the large open head which makes the use of this type of sprayer more practical, absolutely safe in its operation and provides for an efficient and quick operation of the locking means for locking and unlocking the closure member of the tank.

As illustrated in the various figures of the drawings the pressure tank 1, which is suitably made up of sheet metal, is provided with an open dome 2 to which is fastened the open head 3. This head comprises a substantially cylindrical flange having a substantially horizontal flange 4 turned in at the bottom to reduce the opening in the head and provide anchoring means for the open end of the dome 2 to be folded or spun thereover and suitably fastened and sealed thereto. In this way a closure seat 5 is formed at the top of the dome within the open head 3 which surrounds it.

At the top of the open head 3 are provided a pair of concentrically arranged locking flanges 6 and 7 which are turned inwardly of the head and are inclined in the same direction with suitable spaces forming the notches 9, 9 separating these locking flanges at diametrically opposite points at the top of the open head.

The closure member for the open head, which is adapted to move in and out of the head between the locking flanges 6 and 7, comprises the substantially cup-shaped member 10 which is adapted to telescope into the open end of the dome 2 to center itself thereon within the open head and is provided at the top with the outwardly flaring flange 11 to form a seat or support for the cover. A compressible gasket 12 surrounds the outside of the closure member below its seat or supporting flange 11 in order that this gasket may rest on the seat 5 and be compressed thereon to seal the closure member over the large opening provided in the top of the tank by the head 3.

Suitably mounted within the cup-shaped closure member is an inverted U-shaped handle 13 which extends upwardly therefrom and diagonally across the cover. In the sides of this handle are provided the bearings 14, 14 which are in line with each other and have the locking bolt 15 mounted to rock therein. This locking bolt is circular in cross section and is held diametrically in place on top of the closure member so as to have its ends project radially from the edge of the supporting flange 11 of the closure member. The central portion of the locking bolt is offset at 16 substantially in the form of a V and at the apex of the V-shaped offset is mounted the handle 17 with which the locking bolt is adapted to be rocked by raising and lowering the handle as illustrated in Figure 3 of the drawings.

The ends of the bolt 5, which project from the perimeter of the closure member, as above pointed out, have a portion of their periphery cut away as illustrated at 18 in Figure 3 of the drawings. This reduces the width of the free ends of the locking bolt at the cut away portion and provides the bolt with a pair of cams which, when rocked by the handle 17 from a position in which the cut away flat or eccentric surface of the cams engage the under side of the locking flanges 6 and 7 to a position in which the cylindrical concentric surface of the cams engage the locking flanges, depress the closure member and compress the gasket 12 between the flange 11 of the cover and the seat 5 in the head and thus seal the closure member over the opening in the head.

To bring the locking bolt 5 in position for the sealing operation, above described, the closure member is first locked to the head by the bolt. This is done by inserting the closure member into the head with the radially projecting ends of the bolt 5 passing thru the notches or spaces 9, 9 between the locking flanges 6 and 7. After the closure member is seated on the seat 5 of the head, the handle 17 is raised so that the flat or eccentric portion of the cams formed on the ends of the bolt face upwardly and thus reduce the vertical width of the ends of the bolt 5 to permit their movement under the inclined locking flanges 6 and 7 on the rotation of the closure member by means of its handle 13. The closure member is rotated until the cams of the locking bolt are wedged under the locking flanges and prevent a further rotating movement of the closure member on the seat 5. This securely locks the closure member to the seat and in addition provides a preliminary sealing of the closure member thereon. To complete the sealing of the closure member on the seat, the handle 17 is then rocked from the dotted line position to the full line position illustrated in Figure 3 which, as above pointed out, results in a further depression of the closure member and a resultant compression of its gasket on the seat 5. The closure member is thus hermetically sealed to the seat in the head of the pressure tank and will withstand any pressure built up in the tank.

A double acting lock is thus provided for the closure member of the tank in which the preliminary locking action secures the closure member to the head and positions it on the seat so that but a short and quick movement of a handle provides the final and hermetic sealing of the closure member on the tank. Similarly a quick and short reverse movement of the handle releases the seal of the opening in the head by the closure member without however unlocking the closure member from the head. Thus if the handle 17 should inadvertently be operated to effect a release of the seal of the opening by the closure member while the tank is under pressure, the closure member is still held locked to the head and will not be blown off therefrom but will simply be released to move the limited distance allowed by the difference in the width of the cams of the locking bolt 5.

This latter action may be taken advantage of in the removal of the closure member from the head if for any reason the gasket of the closure member sticks to the seat 5 and will not readily disengage itself therefrom. For this purpose the tank is put under sufficient pressure so that on the release of the cover from the compression of the cams of the locking bolt, the pressure within the tank will slightly raise the cover as above pointed out and cause a uniform release of the gasket around the seat to permit the removal of the closure member from the head. The bolt 5 and the cam members formed on the outer ends thereof are mounted on the closure member so as to rest on top of the flange 11 thereof. Any pressure exerted by the cams is thus directly transmitted to the top of the flange 11 for an efficient compression of the gasket located underneath this flange.

As illustrated in Figure 2 of the drawings the handle 13 of the closure member is provided with a central pocket 20 having a hole in the middle of the pocket. The piston rod 21 of the air pump 22 projects thru this hole and has fastened thereto at the top the V-shaped offset middle section of the pump handle 23. This offset section of the handle is adapted to nest into the pocket 20 of the handle 13 to normally hold the pump handle 23 parallel to the closure handle 13 and space the two handles so that both may be gripped with one hand in carrying the sprayer.

The piston rod 21 also passes thru the V-shaped offset section in the locking bolt 5 so as to permit this bolt to freely rock on the closure member without interference from the piston rod. At the same time the piston rod serves as a locking member for the locking bolt as it keeps it from sliding endwise out of engagement with the bearings in the handle 13 after the closure member is removed from the head.

As will be noted from the description and the figures of the drawings, the sealing movement of the handle 13 is downward so that with a firm support of the tank of the sprayer any amount of pressure can be conveniently exerted on the handle for the closing movement thereof. The movement of the handle is a short one so that both the closing and the opening of the seal of the closure member is quickly accomplished with a quick movement of the handle.

As will be seen from an inspection of Figure 2, the cylinder of the air pump 22 is threaded into the inverted central pocket 24 struck up from the bottom of the closure member 10 and is thus securely held suspended therefrom.

In Figures 4 and 5 I have illustrated a slightly modified form of the combined handle and locking bolt carried by the closure member 10. In this modification the handle 25 is substantially bale shaped and formed entirely of rod stock. The ends of the handle carry the cams 26 and each of these cams is provided with a pivotal extension 27 which is mounted in the bearings of the handle 13 to pivotally support both the handle 25 and its cam 26, 26 on the handle with the cams 26 projecting radially from the periphery of the supporting flange of the closure member for engagement under the locking flanges 6 and 7 of the head 3.

In providing the pressure tank of a sprayer with a head having a large opening therein and a correspondingly large closure member or cover for this opening the large cover may be used for the mounting of the delivery tube 28 thereon so as to do away with the mounting of it in the dome shaped end of the pressure tank as illustrated in Figures 1 and 2 of the drawings. This makes the delivery tube removable with the cover for cleaning purposes.

The large cover also provides a suitable mounting for the pressure gauge 29 and locates the gauge in a well protected position within the head where it is not likely to get damaged in the handling of the sprayer.

Figure 7:
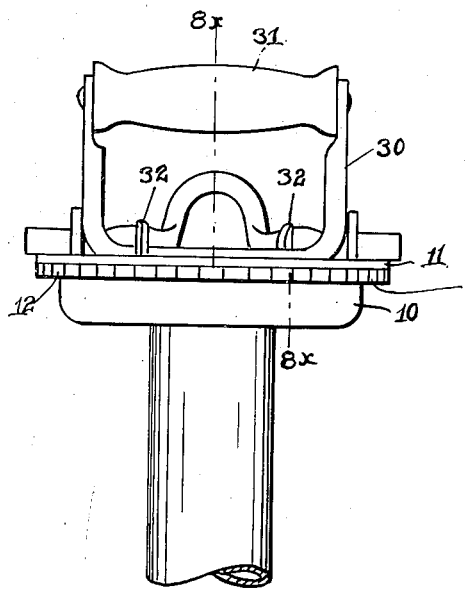
Figure 7 is a side elevation thereof.
Figure 8:
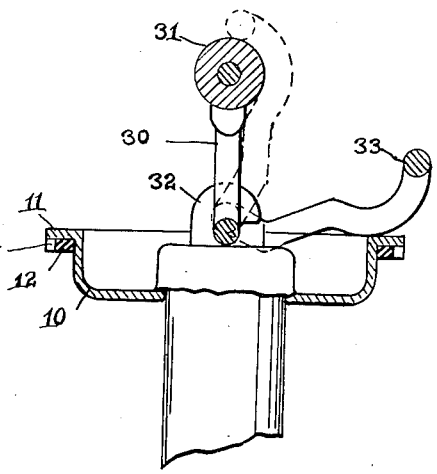
Figure 8 is a vertical sectional view of this modified form of closure member, the section being taken on the line $8x$—$8x$ of Figure 7.

A modified form of the pump handle in combination with locking means for this handle is illustrated in Figures 6 to 8 inclusive. In this modification the pump handle is formed of a U shaped member 30 with the handle member 31 connecting the free ends thereof to complete the handle. The bottom of this handle rests across the top of the cylinder head 24 struck up from the closure member and its ends project radially therefrom. On the outside of the cylinder head at diametrically opposite points thereof are provided a pair of hook shaped lugs 32, 32 which have their lateral openings facing in opposite directions. These openings are so arranged that by turning the handle 30 the projecting ends of the bottom thereof engage thereinto to have the lugs hold the pump handle in a predetermined position on the cover and keep the handle locked to the cover to prevent an upward movement away from the handle and have the pump handle in this position serve as the carrying handle for the sprayer or its cover. When it is desired to operate the pump, the handle is turned into the dotted line position illustrated in Figure 6 in which the handle is disengaged from the hook shaped lugs 31 and 32 and is free to be moved up and down for the operation of the piston in the pump.

In the locked position the handle is held parallel to the bale shaped operating handle 33 of the locking bolt and sealing cams and the outer end of this handle is curved so as to partially encircle the handle member 31 and fit snugly thereagainst as illustrated in dotted lines in Figure 8 so as to permit one hand to grip both of the handles for the convenient handling of the cover on the insertion or removal of it from the head of the tank.

Figure 9:
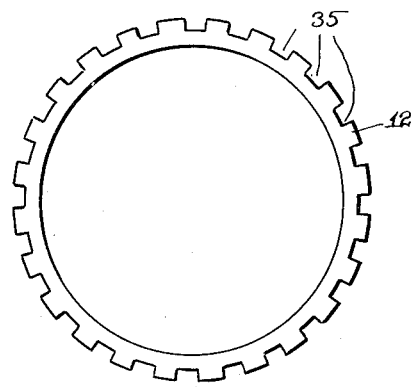
Figure 9 is a top plan view of the gasket used in the modified form of the closure member illustrated in Figures 6 and 7.

In order to provide for a quick release of the gasket from the seat of the open head after the pressure of the cams of the closure member on the gasket is removed, the perimeter of the gasket may be provided with notches 35, 35 as illustrated in Figures 6, 7 and 9. These notches extend radially into the gasket from the outer edge thereof so that when the gasket is compressed and extended to fill the space between the cover and the inner wall of the open head, these notches serve as vent openings thru which air under pressure from the tank may escape when entering under the gasket after the pressure of the cover has been released therefrom. By making it easy for the air to readily escape from under the gasket, the pressure thereof will readily raise the gasket from its seat and prevent a sticking thereto and to the wall of the open head against which the gasket is extended on the compression thereof.

I claim:

1. In a pressure tank the combination of a cylindrical tank open at one end, an open head for said open end, said head comprising a substantially cylindrical flange formed inwardly at both ends to provide a larger opening at one end and a smaller opening at the other end of the flange, the open end of said tank being attached to said flange at the smaller opening thereof to provide a seat surrounding the open end of said tank, a cover for said opening in said head adapted to move into the larger opening of said head and be seated on said seat surrounding the smaller opening thereof and the opening of said tank, inclined and spaced locking flanges formed by the overhanging flange surrounding the larger opening of said head, a locking bolt extending diagonally over said cover and mounted to rock thereon, a cam carried at the ends of said bolts and projecting radially from said cover so as to move thru the spaces between said locking flanges on the insertion of said cover into the head, and engage under said flanges on the rotation of the cover on the seat of the head and means for rocking said bolt to move said cams against said locking flanges and force said cover onto said seat.

2. In combination with an open head for pressure tanks having a seat surrounding the opening in the head, a cover for the opening in said head adapted to rest on said seat, a cam flange partially surrounding said opening and seat and vertically spaced therefrom, a movable locking bolt carried by said cover and arranged thereon to make contact with said cam flange on the movement of said cover on said seat so as to cause said cam flange to force said cover with increasing pressure onto said seat and provide an initial sealing effect of the cover over the opening and means effecting a movement of said locking bolt to increase the pressure on the cover by the bolt and the cam flange.

3. In a pressure container the combination of a seat, a cover for said seat, a locking member associated with said seat, a complementary locking member associated with said cover for rotational movement in a plane parallel to the seat and relative to said seat locking member and into engagement therewith to effect a preliminary sealing between said cover and said seat, one of said locking members being additionally movable with respect to the other and cooperating therewith to effect further locking and sealing between said cover and said seat.

4. In a pressure container the combination of a seat, a cover for rotational movement on said seat, a locking member associated with said seat, a complementary locking member on said cover and movable therewith into engagement with said seat locking member to effect a preliminary sealing between said cover and said seat, one of said locking members being separately movable relative to the other and cooperating with the other locking member to effect further locking and sealing between said cover and said seat.

5. In a pressure container the combination of a seat, a cover for rotational movement on said seat, locking members associated with said seat, complementary locking members on said cover and movable therewith into engagement with said seat locking members to effect a preliminary sealing between said cover and said seat, said cover locking members being movably mounted with respect to the cover and cooperating with said seat locking members to effect further locking and sealing between said cover and said seat.

6. In a pressure container the combination of a seat, a cover for said seat, an imperforate wall on the outside of said seat to provide a filling chamber above said seat, a locking member carried by said wall and a complementary locking member on said cover and movable therewith into engagement with said seat locking member to effect a preliminary sealing between said cover and said seat, said cover locking member being movable with respect to said cover and cooperating with said wall locking member to effect final locking and sealing between said cover and said seat.

7. In a pressure container the combination of a seat, a cover for said seat, a cam member associated with said seat, a bolt member on said cover and movable therewith for engagement with said cam member to effect preliminary sealing between said cover and said seat, said bolt member being movable with respect to said cover and having means thereon cooperating with said cam member to effect final locking and sealing between said cover and said seat.

8. In a pressure container the combination of a seat, a cover for said seat, a cam member associated with said seat, a locking member on said cover and movable therewith for engagement with said cam member to effect a preliminary sealing between said cover and said seat, and cam means provided on said locking member and movable with respect to said cover and cooperating with said seat cam member to effect further locking and sealing between said cover and said seat.

9. In a pressure container the combination of a seat, a cover for said seat, a cam member associated with said seat, a bolt member on said cover and movable therewith with the ends thereof projecting from the cover for engagement with said cam member to effect a preliminary sealing between said cover and said seat, and means for movement of said bolt member with respect to said cover to have said bolt member cooperate with said cam member to effect further locking and sealing between said cover and seat.

10. In a closure for pressure containers the combination of a seat, a cover for said seat, a combined locking and carrying handle on said cover, a cam member associated with said seat, a bolt member on said cover for rotational movement by said handle into engagement with said seat locking member to effect a preliminary sealing between said cover and said seat, said bolt member being movable with respect to said cover and cooperating with said seat cam member to effect a further locking and sealing between said cover and said seat.

11. In an open sheet metal head and closure for pressure tanks the combination of a wall member, an inwardly projecting locking flange and an inwardly projecting seat flange spaced vertically on said wall member, a cover for support on said seat flange below said locking flange, a complementary locking member to said locking flange on said cover and movable therewith to effect preliminary sealing between said cover and said seat flange, said cover locking member being movably mounted with respect to said cover and cooperating with said locking flange to effect further locking and sealing between said cover and seat flange.

12. In an open sheet metal head and closure for pressure tanks the combination of a wall member, an inflaring locking flange and an inflaring seat flange vertically spaced within said wall member, a cover telescopingly engageable into the opening surrounded by said seat flange, an offset outflaring flange on said cover for support on said seat flange, a complementary locking member on said cover and movable therewith for engagement between said inflaring locking flange and outflaring cover flange to effect a preliminary sealing of said cover on said seat flange, said cover locking member being movably mounted with respect to said cover and cooperating with said locking flange to effect further locking and sealing between said cover flange and said seat flange.

13. In a closure for pressure tanks the combination of a seat, a cover for said seat, a handle on said cover for the movement thereof in a horizontal plane on said seat, a locking member associated with said seat, a complementary locking member on said cover and movable therewith on the movement of the cover on the seat by said cover handle to effect a preliminary locking between said locking members and a preliminary sealing between the cover and the seat, and a second handle movable in a vertical plane for movement of said complementary locking member with respect to the cover to effect a final locking and sealing between the cover and the seat.

GILES E. BULLOCK.